3,294,619
MULTILAYER DECORATIVE LAMINATE HAVING A TOP SURFACE OF AN ALKYL ESTER OF 2-FLUOROACRYLATE
James S. Noland, Greenwich, Conn., assignor to Formica Corporation, Cincinnati, Ohio, a corporation of Delaware
No Drawing. Filed Mar. 29, 1962, Ser. No. 183,357
12 Claims. (Cl. 161—165)

This invention relates to novel, unitary, heat- and pressure-consolidated decorative laminated articles and to methods of preparing such articles. More particularly, this invention relates to novel, heat- and pressure-consolidated, thermoset resin-bonded multilayer decorative laminates suitable for outdoor use wherein the upper decorative surface comprises a substantially non-porous sheet of film of a polymer of a lower alkyl ester of 2-fluoroacrylic acid, e.g., a polymer of methyl 2-fluoroacrylate.

The many excellent properties possessed by thermoset, i.e., substantially completely cured, aminotriazine-aldehyde resins such as melamine-formaldehyde resins have led to their widespread use in many important applications. This is particularly true in the case of heat- and pressure-consolidated multilayer decorative laminates intended for indoor use either as horizontal working surfaces, such as table, counter and bar tops, or as vertical decorative surfaces, such as decorative panels, cabinet facings, and the like, where durability and good decorative appearance are prime consumer requirements.

The decorative surfaces of laminates of this type, and especially those of laminates used as horizontal working surfaces, are generally subjected to extensive wear. To lend greater durability to these surfaces without detracting from their decorative appearance it is conventional in preparing this type of laminate to employ a "transulcent" overlay sheet, sometimes referred to as a protective overlay, as the uppermost structural member in the laminate.

Conventional laminates of this type generally comprise, first of all, a base or core member which functions to impart rigidity to the laminate and which usually comprises a solid substrate which may or may not be formed prior to the initial laminating step, e.g., a plurality of sheets of kraft paper impregnated throughout and bonded with a substantially completely cured phenolic resin which has been converted to the thermoset state during the initial laminating step, a precured plastic laminate, such as glass fiber-reinforced thermoset polyester resin laminates and the like, a wood product, such as hardboard, woodwaste or particle boards, plywood, and the like, a mineral base board, such as cement-asbestos board, sheet rock, plaster board, and the like, or a combination of these substrates, e.g., a combination of a plurality of phenolic resin-impregnated kraft paper sheets over a piece of cement-asbestos board, particle board, or the like. A print sheet member, which generally comprises a single sheet or foil of a good grade of absorbent α-cellulose or regenerated cellulose paper or similar fibrous material impregnated with a substantially completely cured aminotriazine-aldehyde resin, usually a thermoset melamine-formaldehyde resin, is directly bonded to the base member. As its name implies, the print sheet is usually printed with an ornamental design or dyed or pigmented to impart color thereto. Finally, a protective overlay, generally comprising a single sheet or foil of high grade α-cellulose paper or similar fibrous material impregnated with a substantially completely cured aminotriazine-aldehyde resin similar to or the same as that used to impregnate the print sheet member, is directly bonded to the print sheet member.

It has frequently been stated in the prior art that the aminotriazine-aldehyde resins, and more particularly the melamine-formaldehyde resins, which are conventionally used to impregnate the protective overlay are ideally suited to this function, in that their use imparts hardness, clarity and durability to the decorative surfaces of all types of laminates. However, in the case of outdoor laminates it has been found from experience that this is only partially true, and that even laminates prepared using such overlays wherein the amount of melamine-formaldehyde resin employed is sufficient to give a resinous surface layer thick enough to protect the decorative surface of the laminate, and particularly the print sheet portion thereof, from the effects of abrasion as commonly encountered in indoor use will, nevertheless, suffer relatively rapid deterioration on exposure to outdoor conditions, i.e., they will not only craze and crack, but they eventually will become cloudy or even completely opaque.

An explanation of the conditions which lead to this deterioration involves consideration of many factors. First of all, unmodified melamine-formaldehyde resins are relatively inflexible. In addition, they have only moderate dimensional stability, particularly if they have been formed into relatively thick resinous layers, and thus various portions of the resinous surface layer associated with the overlay will undergo markedly uneven expansion and contraction. This lack of dimensional stability is believed to be associated with the free moisture content of the cured resin, with moisture generated through progressive condensation, and also with moisture from the atmosphere. It can be readily appreciated that with the passage of time and with continued exposure to heat and sunlight this free moisture will escape more readily from the thinner portions of the resinous surface layer than from the thicker portions, even if the difference in thickness between these portions is relatively slight, and every indication induces those skilled in the art to believe that when a state of moisture imbalance is eventually reached which will cause dimensional instability, the system, i.e., the relatively inflexible resinous surface layer, will adjust itself by means of cracking or crazing to relieve the built-up dimensional stresses.

At this point another factor enters the picture. Cracking and crazing of the resinous surface layer will in time expose the overlay sheet itself. Once this occurs the fibrous structure of the overlay sheet, acting as a wick, draws moisture from the atmosphere into the laminate. This produces several undesirable results. First of all, it leads to further deterioration of the resinous surface layer. It also causes deterioration of the resinous layer between the overlay and print sheets. Of primary importance, however, is the fact that it causes the overlay and, eventually, the print sheet member (since it too has a fibrous structure), to deteriorate, thus destroying the desired transparency.

Numerous attempts have been made by those skilled in the art to overcome the inherent deficiences found in melamine-formaldehyde resin-impregnated outdoor decorative laminates. For example, in an attempt to minimize the dimensional instability associated with relatively thick resinous surface layers, laminates of the type in question were prepared using overlays impregnated with just enough melamine-formaldehyde resin to provide a very thin resinous surface layer. It was soon found that wind-driven dust, as well as other sources of abrasion normally encountered in outdoor use, quickly exposed the overlay sheet to atmospheric moisture, leading to the same wicking action by the overlay's fibrous structure and, eventually, to cracking, crazing, cloudiness and opacity.

Another attempt to solve this problem involved the preparation of laminates containing no protective overlay sheet, wherein the decorative surface consisted solely of a layer of melamine-formaldehyde resin on top of a print sheet. However, cured melamine-formaldehyde resin without the reinforcing effect of cellulose fibers or their equivalent is relatively inflexible, and therefore highly susceptible to crazing. As a result, laminates of this type proved to be extremely difficult to fabricate. In most cases they cracked or crazed immediately upon removal from the press, and those that did not deteriorated rapidly on exposure to outdoor conditions. Thus, the experience of the prior art has been that melamine-formaldehyde resin-impregnated decorative laminates, either with or without protective overlays, are unsuitable for outdoor use.

I have now discovered that by replacing the aforementioned aminotriazine-aldehyde resin-impregnated protective overlay sheet with a substantially non-porous sheet or film of a polymer of a lower alkyl ester of 2-fluoroacrylic acid, e.g., a polymer of methyl 2-fluoroacrylate (the methyl ester of 2-fluoroacrylic acid), a solution to each of the problems described hereinabove is provided. More particularly, the practice of the present invention provides novel heat- and pressure-consolidated thermoset resin-impregnated multilayer decorative laminates which may be satisfactorily employed for outdoor uses, for example as building panels, message-bearing signs and the like, and which are characterized by excellent heat- and solvent-resistance, dimensional stability and resistance to crazing, as well as by improved transparency of the overlay member, which in turn imparts a pleasing depth to the decorative surface.

It is, therefore, an object of my invention to prepare novel, unitary, heat- and pressure-consolidated, thermoset resin-bonded multilayer decorative laminates.

It is also an object of my invention to prepare novel, unitary, heat- and pressure-consolidated thermoset resin-bonded multilayer decorative laminates suitable for outdoor use wherein the decorative surface comprises a substantially non-porous sheet or film of a polymer of a lower alkyl ester of 2-fluoroacrylic acid.

A further object of my invention is to prepare novel, unitary, heat- and pressure-consolidated thermoset resin-bonded multilayer decorative laminates suitable for outdoor use wherein a melamine-formaldehyde resin-impregnated print sheet is overlaid with a substantially non-porous sheet or film of a polymer of methyl 2-fluoroacrylate.

These and other objects of my invention will be discussed more fully hereinbelow.

As indicated hereinabove, my novel combination of an aminotriazine-aldehyde resin-impregnated print sheet overlaid with a substantially non-porous sheet or film of a polymer of a lower alkyl ester of 2-fluoroacrylic acid can be applied to any of a plurality of conventional base or core members, due primarily to the fact that the base member usually cannot be seen when the laminate is in use, and additionally since this part of the laminate is not subjected to ordinary wear. One highly suitable class of base or core members comprises the phenolic resin-impregnated base members employed in the manufacture of conventional decorative laminates. Such base members are united with my novel combination of overlay member and print sheet by employing, as the bottommost member of an individual laminating assembly, one or more sheets or plies of a low-cost kraft paper, creped kraft paper, or both, which have been impregnated with the least amount of a thermosetting phenolic resin capable of providing a good bond in the core assembly, e.g., amounts of phenolic resin ranging from about 25% to about 40% by weight, based on the total weight of the impregnated paper. The print sheet and overlay members are then placed over this core assembly, and the entire laminating assembly is then consolidated, by means of heat and pressure, in one pressing operation.

Ordinarily, from about 5 to about 8 sheets of phenolic resin-impregnated paper will be used, thereby providing a base member which, in the finished laminate, will usually be at least about one sixteenth of an inch thick. It should be noted, however, that laminates of this type wherein the thickness of the entire assembly of the overlay, print sheet and base members is as little as about one thirty-second of an inch or less, as obtained by using fewer phenolic resin-impregnated sheets in the base member, can be prepared and are suitable for many uses. Thus, neither the number of sheets of paper, the amount of phenolic resin, nor the thickness ultimately achieved in a base member of this type is critical. However, it has been found that a thickness of at least one sixteenth of an inch in this type of base member is especially desirable when the laminate (comprising, for example, an overlay member of a polymer of methyl 2-fluoroacrylate, a melamine-formaldehyde resin-impregnated print sheet and a phenolic resin-impregnated paper base member) is consolidated, either during the initial laminating step by means of heat and pressure or afterwards by adhesive bonding, with an additional solid or precured substrate of the type mentioned hereinabove, e.g., a piece of asbestos-cement board, particle board, or the like, in that phenolic resin-impregnated paper base members having at least this minimum thickness are better able to relieve or take up stresses produced by these additional substrates, certain of which are relatively dimensionally unstable, thereby preventing such stresses from causing cracking or crazing on the decorative surface of the laminate. It has also been found that even where no phenolic resin-impregnated paper base member is used, the thickness of the solid substrate used in its place should be at least about one sixteenth of an inch for the same reason, with the thickness of any particular solid substrate chosen being correlated with its density whereby said substrate is adapted to retain its form under moderate stress. The maximum thickness of any of the base members in question is governed by practical considerations, e.g., cost, availability, where and how the finished laminate is to be used, and so forth.

The thermosetting phenolic resins used to impregnate a base or core member comprising one or more sheets of kraft or creped kraft paper are well known in the art as shown, for example, in U.S. Patents Nos. 2,205,427, 2,315,087 and 2,328,592, among others, which are incorporated herein by reference. These resins are conventionally obtained by reacting a phenolic substance such as phenol itself, substituted phenols, e.g., alkyl phenols such as cresols, xylenols, tertiary alkyl phenols, and the like, or mixtures of such phenolic substances, with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, e.g., melamine, lignin derivatives, and the like.

Further details relating to base or core members which can be used in practicing the present invention may be found in U.S. Patent No. 3,021,239 to Lindenfelser et al., which is also incorporated herein by reference.

Just as in the case of the base or core member the print sheet members employed in preparing laminates according to the practice of the present invention do not differ from those employed in preparing conventional decorative laminates. Ordinarily, a sheet or foil of absorbent α-cellulose or regenerated cellulose paper of from about 4 to about 8 mils thick, impregnated with from about 25% to about 60% by weight, and preferably from about 35% to about 45% by weight, based on the total weight of the impregnated paper, of a thermosetting aminotriazine-aldehyde resin, will be employed. Printed designs having an unlimited range or form of artistic effects may be employed, so long as the inks or other coloring matter contained therein are non-bleeding in the aminotriazine-aldehyde resin comprising the infused resin component of the print sheet member. The print sheet also serves as a barrier sheet for the base or core member, thus masking the unattractive appearance of the core and also, in the case of a phenolic resin-impregnated core, barring any extensive bleeding or migration of the phenolic resin from the core, thereby preventing the appearance of said resin on the decorative surface of the laminate.

The thermosetting aminotriazine-aldehyde resins used to impregnate the print sheet member, as well as techniques for their preparation, are also well known in the art, as shown for example in U.S. Patents Nos. 2,197,357 to Widmer et al. and 2,260,239 to Talbot. These conventional thermosetting aminotriazine-aldehyde resins are synthetic resins wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di- and tri-substituted melamines, such as the mono- di- and trimethylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, or salts thereof may also be employed to regulate the pH.

If desired, the thermosetting aminotriazine-aldehyde resin may be modified by the addition thereto of plasticizers such as α-alkyl-D-glucosides, e.g., α-methyl-D-glucoside, as disclosed in U.S. Patent No. 2,773,848 to Lindenfelser, methylol derivatives of sulfonamides, e.g., N-methylol-p-toluenesulfonamide (which may be formed in situ by the addition of p-toluenesulfonamide to the aminotriazine-aldehyde reaction mixture), or combinations of these glucosides and methylol sulfonamides, as disclosed in U.S. Patent No. 2,773,788 to Magrane et al. In addition, the thermosetting aminotriazine-aldehyde resin may also contain commonly employed curing catalysts, such as phosphoric acid, phthalic acid, p-toluenesulfonic acid, mixtures of alkyl alkylol tertiary amines, e.g., diethylethanolamine, and acids, e.g., acetic acid, and the like, although in most cases uncatalyzed resin will be preferred.

Polymers of the lower alkyl, e.g., methyl, ethyl, propyl and butyl, esters of 2-fluoroacrylic acid are well known in the art. One convenient method for their preparation is disclosed in U.S. Patent No. 2,956,939 to Anspon. The techniques which can be used in forming a substantially non-porous sheet or film from a polymer of a lower alkyl ester of 2-fluoroacrylic acid for use as the overlay member in my novel laminates are equally well known in the art. For example, a sheet or film can be formed by techniques such as flat extrusion, blown tubular extrusion, casting, and the like, which are so well known in the art that it is not deemed necessary to describe them here at any great length, and then laid over the print sheet in the laminating assembly. A detailed treatment of these techniques may be found in the "Plastics Engineering Handbook of the Society of the Plastics Industry, Inc." (New York: Reinhold Publishing Corporation; 3rd. edition—1960) at pages 81–90 and 198 to 205.

A sheet or film of a polymer of a lower alkyl ester of 2-fluoroacrylic acid can also be formed by a coating technique. In this case, the surface of the print sheet opposite the side which will be in contact with the base or core member is coated, e.g., by brush-, spray-, or roller-coating or the like, with either a solution of the poly-2-fluoroacrylate in any volatile organic solvent which is substantially non-reactive with the thermosetting aminotriazine-aldehyde resinous impregnant in the print sheet under the conditions employed in this technique, e.g., chloroform, acetonitrile, and the like, as well as mixtures thereof, or with an aqueous emulsion of the poly-2-fluoroacrylate. The solvent or water is then evaporated, either by letting the coated print sheet stand at room temperature for a sufficient period of time or by heating it at a temperature below the temperature at which the thermosetting aminotriazine-aldehyde resinous impregnant of the print sheet will be substantially advanced in cure, e.g., at a temperature of from about 30° C. to about 70° C. for from about 10 to about 30 minutes, leaving the substantially non-porous sheet or film of the poly-2-fluoroacrylate on one surface of the print sheet.

Methyl 2-fluoroacrylate is the preferred lower alkyl ester of 2-fluoroacrylic acid used in preparing the polymers employed in the practice of the present invention, and the methyl 2-fluoroacrylate polymer employed is preferably a homopolymer of methyl 2-fluoroacrylate. However, copolymers of methyl 2-fluoroacrylate containing not more than about 30% by weight, and preferably from about 5% to about 20% by weight, based on the total weight of the copolymer, of one or more ethylenically unsaturated monomers copolymerizable therewith can also be employed, particularly where it is desired to modify the physical properties of the polymeric sheet or film, e.g., to impart even greater heat-resistance or solvent-resistance thereto. A plurality of such comonomers are known in the prior art, included among which are acrylic acid, methacrylic acid, methacrylic acid esters, e.g., methyl methacrylate, ethyl methacrylate, propyl methacrylate, butyl methacrylate, and the like, and acrylic acid esters, e.g., methyl acrylate, ethyl acrylate, butyl acrylate, and the like, as well as the other lower alkyl esters of 2-fluoroacrylic acid. The alkyl acrylates also function to impart a beneficial degree of internal plasticization to a lower alkyl 2-fluoroacrylate copolymer prepared therewith.

Whether a homopolymer or a copolymer of a lower alkyl ester of 2-fluoroacrylic acid is used to prepare the polymeric sheet or film, its molecular weight will range from about 100,000 to about 1,000,000, and preferably from about 400,000 to about 600,000, as determined by light scattering measurements (see Allen, "Techniques of Polymer Characterization" (New York: Academic Press, 1959)), inasmuch as sheets or films prepared from polymers molecular weights substantially lower than 100,000 will generally be deficient in one or more necessary physical properties, e.g., heat- or solvent-resistance, while sheets or films prepared from polymers having molecular weights substantially greater than 1,000,000 can generally be incorporated into the laminate structure only by using temperatures and pressures which would be harmful to the remainder of said structure.

Besides internal plasticizers such as the alkyl acrylates, other well-known plasticizers, such as dibutyl phthalate, dioctyl phthalate, lower molecular weight polyethylene glycols, and the like, or lubricants, such as stearyl alcohol and the like, may be incorporated into the 2-fluoroacrylate polymer. The amount of plasticizer or lubricant employed may range up to about 10% by weight, based on the total weight of the plasticized or lubricated polymer.

Substantially non-porous sheets or films of a polymer of a lower alkyl ester of 2-fluoroacrylic acid which range in thickness from about 0.5 mil to about 30 mils, and preferably from about 1 mil to about 5 mils, will be employed in practicing the present invention. It is not necessary that the polymeric sheet or film be entirely free of minor flaws such as bubbles, extrusion marks, and the like, inasmuch as such flaws will be pressed out of the sheet or film during the laminating operation. If desired, the polymeric sheet or film may be biaxially or multiaxially stretched (stress-oriented) in the manner known in the prior art before being assembled with the remaining members of the laminating assembly to further improve certain of its physical properties, e.g., to further improve its craze-resistance and solvent resistance.

Conventional laminating techniques are employed in preparing my novel laminates. The print sheet and, where a phenolic resin-impregnated paper base or core member is employed, the sheets constituting said base or core member, are first impregnated with solutions or dispersions of the respective resins using such methods as dipping, roll coating, spraying, or the like. Once these sheets have been impregnated, they are dried at elevated temperatures, using a forced hot air drying oven, infrared heating means, or the like, to a desired volatile content, e.g., in the case of the print sheet, to a volatile content in the range of from about 2% to about 8% by weight, and preferably from about 3% to about 6% by weight, and in the case of the sheets constituting said core member, to a volatile content in the range of from about 4% to about 12% by weight, and preferably from about 6% to about 10% by weight, each of said volatile content being based on the total weight of the respective dried, impregnated sheets. The print sheet member, together with a separately formed substantially non-porous sheet or film of a polymer of a lower alkyl ester of 2-fluoroacrylic acid or bearing a substantially non-porous sheet or film of the poly-2-fluoroacrylate deposited on the print sheet by the above-described coating technique, is then assembled, together with the base or core member, or the individual sheets which, when consolidated by means of heat and pressure, will constitute all or part of the base or core member, between laminating press plates, e.g., stainless steel press plates which may have finishes ranging from a mirror polish to a matt surface, then inserted in a laminating press, either as a single assembly or as a multiple assembly of two or more such structures, and consolidated by means of heat and pressure into a unitary decorative structure. Besides laminates made up of a single substantially non-porous sheet or film of poly-2-fluoroacrylate directly bonded to a print sheet member which is in turn directly bonded to a base or core member, balanced laminates consisting of print sheet and poly-2-fluoroacrylate overlay members bonded to each side of the base or core member may also be prepared.

Temperatures ranging from about 135° C. to about 160° C., preferably from about 150° C. to about 155° C., and pressures ranging from about 200 p.s.i. to about 1500 p.s.i., will be employed. The particular pressure employed depends in large measure upon the nature of the base or core member employed. For example, where a conventional "low pressure" substrate, e.g., flakeboard, plywood, and the like, is used pressures ranging from about 200 to about 350 p.s.i., and preferably from about 250 to about 300 p.s.i., will be used. Conversely, when a conventional "high pressure" substrate, e.g., a plurality of sheets of phenolic resin-impregnated paper, a cement-asbestos board, and the like, is used pressure ranging from about 800 to about 1500 p.s.i., and preferably from about 1100 to about 1200 p.s.i., will generally be employed. The time required to effect substantially complete cure of the thermosetting resinous components of the print sheet and base or core members and to bond the substantially non-porous polymeric overlay sheet or film to the print sheet member when employing temperatures and pressures within the above-stated ranges will usually be from about 15 minutes to about 35 minutes. The resulting laminate is allowed to cool to at least the heat distortion temperature of its substantially non-porous overlay member, and preferably to a temperature of less than about 50° C., before being removed from the press.

In order that those skilled in the art may more fully understand the inventive concept presented herein, the following examples are set forth. These examples are given primarily for the purpose of illustration, and should not be considered as expressing limitations unless so set forth in the appended claims. All parts and percentages are by weight, unless otherwise stated.

*Example I*

The required amount of commercially available spray-dried melamine-formaldehyde resin (mol ratio formaldehyde:melamine=2:1, respectively) was dissolved in a mixture of 95% water and 5% isopropanol to give a resin syrup having a resin solids content of 50%.

A sheet of commercially available α-cellulose print paper, 5 mils thick, printed with a walnut grain wood print design, was dipped in the melamine-formaldehyde resin syrup, impregnated to a resin content of 42%, and then oven-dried to a volatile content of 4.3%.

A laminating assembly was then prepared by first placing the dried, impregnated print sheet on top of a base member consisting of five sheets of standard phenolic resin-impregnated core stock, each sheet being 10 mils thick and having a resin content of 30%, a volatile content of 7.7% and a flow of 4.6%. Next, a substantially non-porous 2 mil thick film of polymethyl-2-fluoroacrylate (average molecular weight approximately 1,000,000), cast from a nitromethane solution of the polymer, was placed over the print sheet. The entire assembly was then positioned between a pair of stainless steel press plates having a mirror polish finish and laminated at a temperature of 150° C. under a pressure of 1100 p.s.i. for 30 minutes. The resulting laminate, after being allowed to cool to room temperature, was removed from the press. It was found that the film of polymethyl-2-fluoroacrylate had tightly bonded to the melamine-formaldehyde resin-impregnated print sheet and could not be removed therefrom. The decorative surface of the laminate was smooth and highly glossy and had good physical appearance.

*Example II*

The procedure given in Example I was repeated in every detail except the following. The bottom two sheets in the core assembly were replaced by two sheets of standard phenolic resin-impregnated creped kraft paper core stock, each 8 mils thick and each having a resin content of about 35%, a volatile content of 6.8% and a flow of 15.8%, and the 2 mil thick film of polymethyl-2-fluoroacrylate was replaced by a 10 mil thick film of the same material. The laminate obtained also had a smooth, highly glossy decorative surface and good physical appearance.

*Example III*

A sheet of commercially available α-cellulose print paper, 5 mils thick, pigmented with titanium dioxide, was dipped in the melamine-formaldehyde resin syrup described in Example I, impregnated to a resin content of 42.1%, and then oven-dried to a volatile content of 3.8%. The dried, impregnated print sheet was then placed on top of a base member consisting of five sheets of standard phenolic resin-impregnated core stock indentical to those described in Example I. Next, a substantially non-porous 2 mil thick film of polymethyl-2-fluoroacrylate identical to that described in Example I was placed over the print sheet. The entire assembly was then positioned between a pair of stainless steel press plates having a mirror polish finish and laminated at a temperature of 150° C. under a pressure of 1100 p.s.i. for 30 minutes. The resulting laminate had a smooth, glossy decorative surface.

This laminate was then bonded to a ⅛ inch thick piece of standard cement-asbestos board by first coating the non-decorative surface of the laminate and one side of the cement-asbestos board with a 1–2 mil thick coating of Formica "Fast-Dry" rubber-based adhesive, then allowing the coated surfaces to stand at room temperature until the adhesive was dry to the touch, and finally assembling the two coated surfaces and applying contact pressure to the assembly with a hand roller to insure total contact between the surfaces being bonded.

The decorative (polymethyl-2-fluoroacrylate) surface of the resulting laminate was then tested for its resistance to discoloration and degradation on exposure to ultraviolet light and accelerated weathering conditions according to the procedure set forth in A.S.T.M. Standard D1499–59T, using a Model DLTD Atlas Weather-O-meter which had been modified by replacing its carbon arc with a battery of alternating fluorescent ultraviolet sun lamps and black light lamps. After 570 hours, the decorative surface of the laminate had not been substantially affected by the accelerated weathering conditions, and the total color change (E value) was only 0.3, indicating a negligible degree of color change.

The E value is determined by comparing, by means of a photoelectric reflectometer, the light reflected from the decorative surface of the laminate with the light reflected from a standard "pure white" magnesium oxide plate both before and after the laminate has been exposed to accelerated weathering conditions. Color change is meas- ured in three ways; in terms of "grayness" ("L" scale; 100=white, 0=black), redness/greeness ("a" scale; 0=neutral, positive values=red, negative values=green) and blueness/yellowness ("b" scale; 0=neutral, positive values=yellow, negative values=blue). For any two laminate samples, or for the same sample before and after exposure to accelerated weathering conditions, the color difference or total color change is expressed as:

$$E = (\Delta \overline{L}^2 + \Delta \overline{a}^2 + \Delta \overline{b}^2)^{1/2}$$

*Example IV*

Three sheets of commercially available α-cellulose print sheet paper, each 5 mils thick and each printed with a limed oak wood print design, were dipped in the melamine-formaldehyde resin syrup described in Example I, impregnated to the resin content of approximately 42% and then oven-dried to a volatile content of approximately 4%.

Laminating assemblies were then prepared by first placing one of the dried, impregnated print sheets over each of the following base members—a ½ inch thick piece of flakeboard, a ¼ inch thick piece of Douglas fir plywood and a ⅛ inch thick piece of tempered hardboard—and then placing a substantially nonporous 2 mil thick film of polymethyl-2-fluoroacrylate identical to that described in Example I over each print sheet. The three assemblies were then positioned between individual pairs of mirror finished stainless steel press plates and laminated at a temperature of 140° C. under a pressure of 250 p.s.i. for 30 minutes. In all cases, the decorative surfaces of the resulting laminates were smooth and glossy, and exhibited no crazing at the polymethyl-2-fluoroacrylate film-print sheet interface when exposed to common organic solvents.

*Example V*

Two commercially available α-cellulose print sheet papers bearing the same black oak wood print design were each impregnated with 44% of the melamine-formaldehyde resin syrup described in Example I and then oven-dried to a volatile content of 5.3%. The dried, impregnated print sheets were then placed on opposite sides of a base member consisting of six sheets of standard phenolic resin-impregnated kraft paper core stock identical to those described in Example I. Next, a 5 mil thick substantially non-porous film of a copolymer of 95% of methyl 2-fluoroacrylate and 5% of methyl methacrylate (average molecular weight approximately 1,000,000), cast from a nitromethane solution of the polymer, was placed over each print sheet. The assembly was then laminated between stainless steel press plates having a mirror polish finish at a temperature of 150° C. under a pressure of 1100 p.s.i. for 30 minutes. The resulting laminate was allowed to cool to room temperature before being removed from the press. Each decorative surface was smooth and highly glossy.

It will be obvious to those skilled in the art that other changes and variations can be made in carrying out the present invention without departing from the spirit and scope thereof as defined in the appended claims.

I claim:

1. A unitary, heat- and pressure-consolidated decorative laminated article which comprises a superimposed assembly of:
   (1) a rigidity-imparting base member,
   (2) a print sheet member directly bonded to said base member comprising a fibrous sheet impregnated with a substantially completely cured aminotriazine-aldehyde resin, and
   (3) a substantially non-porous film, of from about 0.5 to about 30 mils in thickness, of a polymeric material selected from the group consisting of homopolymers of a lower alkyl ester of 2-fluoroacrylic acid and copolymers of a lower alkyl ester of 2-fluoroacrylic acid with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

2. A unitary, heat- and pressure-consolidated decorative laminated article which comprises a superimposed assembly of:
   (1) a rigidity-imparting base member,
   (2) a print sheet member directly bonded to said base member comprising a fibrous sheet impregnated with a substantially completely cured aminotriazine-aldehyde resin, and
   (3) a substantially non-porous film, of from about 0.5 to about 30 mils in thickness, of a polymeric material selected from the group consisting of homopolymers of methyl 2-fluoroacrylate and copolymers of methyl 2-fluoroacrylate with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

3. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured aminotriazine-aldehyde resin, and
  (3) a substantially non-porous film, of from about 1 to about 5 mils in thickness, of a polymeric material selected from the group consisting of homopolymers of methyl 2-fluoroacrylate and copolymers of methyl 2-fluoroacrylate with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

4. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured aminotriazine-aldehyde resin, and
  (3) a substantially non-porous film, of from about 0.5 to about 30 mils in thickness, of polymethyl-2-fluoroacrylate directly bonded to said print sheet member.

5. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured aminotriazine-aldehyde resin, and
  (3) a substantially non-porous film, of from about 1 to about 5 mils in thickness, of polymethyl-2-fluoroacrylate directly bonded to said print sheet member.

6. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured melamine-formaldehyde resin, and
  (3) a substantially non-porous film, of from about 0.5 to about 30 mils in thickness, of a polymeric material selected from the group consisting of homopolymers of a lower alkyl ester of 2-fluoroacrylic acid and copolymers of a lower alkyl ester of 2-fluoroacrylic acid with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

7. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured melamine-formaldehyde resin, and
  (3) a substantially non-porous film, of from about 0.5 to about 30 mils in thickness, of a polymeric material selected from the group consisting of homopolymers of methyl 2-fluoroacrylate and copolymers of methyl 2-fluoroacrylate with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

8. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured melamine-formaldehyde resin, and
  (3) a substantially non-porous film, of from about 1 to about 5 mils in thickness, of a polymeric material selected from the group consisting of homopolymers of methyl 2-fluoroacrylate and copolymers of methyl 2-fluoroacrylate with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

9. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured melamine-formaldehyde resin, and
  (3) a substantially non-porous film, of from about 0.5 to about 30 mils in thickness, of polymethyl-2-fluoroacrylate directly bonded to said print sheet member.

10. A unitary, heat- and pressure-consolidated decorative laminated article which comprises a superimposed assembly of:
  (1) a rigidity-imparting base member,
  (2) a print sheet member directly bonded to said base member comprising a fibrous sheet impregnated with a substantially completely cured melamine-formaldehyde resin, and
  (3) a substantially non-porous film, of from about 1 to about 5 mils in thickness, of polymethyl-2-fluoroacrylate directly bonded to said print sheet member.

11. A unitary, heat- and pressure-consolidated decorative laminated article which comprises a superimposed assembly of:
  (1) a rigidity-imparting base member comprising a plurality of fibrous sheets impregnated and bonded together with a substantially completely cured phenolic resin,
  (2) a print sheet member directly bonded to said base member comprising a fibrous sheet impregnated with a substantially completely cured melamine-formaldehyde resin, and
  (3) a substantially non-porous film, of from about 1 to about 5 mils in thickness, of a polymeric material selected from the group consisting of homopolymers of methyl 2-fluoroacrylate and copolymers of methyl 2-fluoroacrylate with not more than about 30%, by weight, based on the total weight of said copolymer of a different ethylenically unsaturated monomer copolymerizable therewith and selected from the group consisting of an acrylic acid and an alkyl ester of an acrylic acid, directly bonded to said print sheet member.

12. A unitary, heat- and pressure-consolidated decorative laminated article which comprises a superimposed assembly of:
(1) a rigidity-imparting base member comprising a plurality of fibrous sheets impregnated and bonded together with a substantially completely cured phenolic resin,
(2) a print sheet member directly bonded to said base member comprising a fibrous sheet impregnated with a substantially completely cured melamine-formaldehyde resin, and
(3) a substantially non-porous film, of from about 1 to about 5 mils in thickness, of polymethyl-2-fluoroacrylate directly bonded to said print sheet member.

References Cited by the Examiner

UNITED STATES PATENTS

| | | | |
|---|---|---|---|
| 2,732,325 | 1/1956 | Lindenfelser et al. | 161—264 |
| 2,941,917 | 6/1960 | Anspon et al. | 156—332 |
| 2,956,939 | 10/1960 | Anspon | 260—89.5 |
| 3,012,906 | 12/1961 | Anspon | 117—72 |

JACOB H. STEINBERG, *Primary Examiner.*

EARL M. BERGERT, *Examiner.*

R. J. ROCHE, *Assistant Examiner.*